United States Patent
Shah et al.

(10) Patent No.: US 9,201,634 B2
(45) Date of Patent: Dec. 1, 2015

(54) METHOD AND SYSTEM FOR CONTROLLING USER EXPERIENCE WITH AN APPLICATION ON A CLIENT DEVICE

(75) Inventors: Dipesh Amritlal Shah, Bangalore (IN); Balaji Nerella Venkataramana, Bangalore (IN); Satish Nanjunda Swamy Jamadagni, Bangalore (IN)

(73) Assignee: Samsung Electronics Co., Ltd (KR)

( * ) Notice: Subject to any disclaimer, the term of this patent is extended or adjusted under 35 U.S.C. 154(b) by 182 days.

(21) Appl. No.: 13/493,468

(22) Filed: Jun. 11, 2012

(65) Prior Publication Data

US 2012/0317185 A1 Dec. 13, 2012

(30) Foreign Application Priority Data

Jun. 9, 2011 (IN) .......................... 1964/CHE/2011

(51) Int. Cl.
*G06F 15/16* (2006.01)
*G06F 9/44* (2006.01)
*H04L 29/08* (2006.01)

(52) U.S. Cl.
CPC *G06F 8/38* (2013.01); *H04L 67/10* (2013.01); *H04L 67/306* (2013.01); *H04L 67/34* (2013.01)

(58) Field of Classification Search
CPC ....... G06G 11/30; G06F 8/38; G06F 11/3438; G06F 2201/875; G06F 17/30861; H04L 67/10; H04L 67/22; H04L 67/30; H04L 67/306; H04L 67/34
USPC ................. 709/219, 203, 204; 717/178, 115; 715/744, 239, 748; 726/7
See application file for complete search history.

(56) References Cited

U.S. PATENT DOCUMENTS

| | | | |
|---|---|---|---|
| 2006/0212514 A1* | 9/2006 | Saillet | 709/203 |
| 2007/0156856 A1* | 7/2007 | Shafron | 709/219 |
| 2009/0313619 A1* | 12/2009 | Parthasarathy et al. | 717/178 |
| 2011/0093941 A1* | 4/2011 | Liu et al. | 726/7 |
| 2012/0254768 A1* | 10/2012 | Aggarwal et al. | 715/744 |
| 2012/0291011 A1* | 11/2012 | Quine | 717/115 |
| 2012/0304265 A1* | 11/2012 | Richter et al. | 726/7 |

* cited by examiner

*Primary Examiner* — Jungwon Chang
(74) *Attorney, Agent, or Firm* — The Farrell Law Firm, P.C.

(57) ABSTRACT

A method of controlling user experience with an application on a client device including at least two resident client entities is provided. The method includes modifying behavior of the application on the client device through negotiation between the at least two resident entities according to pre-defined rules; and rendering the application on the client device based on the pre-defined rules using at least one of the resident client entities.

24 Claims, 12 Drawing Sheets

METHOD AND SYSTEM FOR CONTROLLING USER EXPERIENCE WITH AN APPLICATION ON A CLIENT DEVICE

PRIORITY

This application claims priority under 35 U.S.C. §119(a) to Indian Patent Application No. 1964/CHE/2011 filed in the Indian Patent Office on Jun. 9, 2011, the entire disclosure of which is herein by reference.

BACKGROUND OF THE INVENTION

1. Field of the Invention

The present invention relates generally to computing devices, and more particularly, to customizing user experience with applications on computing devices.

2. Description of the Related Art

Advances in computing technology have resulted in improvements in processing speeds. Today, even hand-held devices have more processing power as compared to the huge personal computers of a decade ago. At the same time, the infrastructure of the Internet has also improved over the years to provide improved bandwidth, allowing users to access data and greater speeds than ever before.

Due to the increased processing power and greater Internet speeds along with many other technological advances, computing can now be performed on data stored over a large-scale networked data centers on an on-demand basis. Data stored in such data centers is accessed through the Internet as needed. Such advances in technology have enabled the movement of computing resources for User or business-oriented applications from in-house systems to the Internet by way of hosted server services.

Remote hosting of resources is user friendly and requires no specific knowledge, expertise or control over the technology infrastructure supporting services used over the Internet. It provides services to the user by resource providers in order to have efficient computing performance at user's system. The computing resources are generally managed by an individual resource provider, such as a large-scale data center, and the like. The computing resources execute the user requested task and can be managed by an individual resource provider which include, for example, Central Processing Unit (CPU) capability, memory, storage capacity, development platforms, application programs, and the like. Thus, the remote hosting of resources enables relocating of applications, services and data from a client/user system to a remote main server farm over a network implemented as a service. Relocating the execution of applications, deployment of services, and storage of data, allows users and businesses to manage costs of open systems, centralize information, make their systems more robust and reduce energy costs.

When the remote hosting of resources is performed over a network of servers on the Internet, then such remote hosting is often referred to as "cloud" computing.

Owing to the various advantages discussed above, remote or "cloud"-based services have enabled user applications and services to be moved to network providers that can perform many of requested tasks on behalf of a user's device. However, there are significant disadvantages with the transfer of applications to a centralized "cloud" server. The disadvantage is that device manufacturers have very little or no control over the user experience or application control in such an environment.

There is a need in the art to provide sufficient provision in a cloud computing or remote hosting environment where client devices can control user experience through customization of applications.

SUMMARY OF THE INVENTION

Accordingly, the present invention has been made to solve the above-stated problems occurring in the prior art, and an aspect of the present invention enables customization of an application to enhance user experience on a computing device.

Another aspect of the present invention is to enable customization of an application to enhance user experience on a computing device by having one or more resident client entities negotiate with one or more client execution entities or a server on aspects of the application that can be customized.

Another aspect of the present invention is to enable customization of an application to enhance user experience on a computing device by having one or more resident client entities negotiate with one or more client execution entities or a server on tasks that can be delegated to the resident client entities.

In accordance with an aspect of the present invention, a method of controlling user experience with an application on a client device including at least two resident client entities is provided. The method includes modifying behavior of the application on the client device through negotiation between the at least two resident entities according to pre-defined rules; and rendering the application on the client device based on the pre-defined rules using at least one of the resident client entities.

A method of controlling user experience with an application on a client device, the client device comprising at least one client execution entity and at least one resident client entity is provided. The method includes modifying behavior of the application on the client device through negotiation between the at least one resident client entity and the at least one client execution entity according to pre-defined rules; and rendering the application based on the pre-defined rules by the at least one client execution entity.

In accordance with another aspect of the present invention, a method of controlling user experience with an application downloaded from a server to a client device, the client device comprising at least one client execution entity and at least one resident client entity is provided. The method includes modifying behavior of the application on the client device through negotiation between the at least one resident client entity and the server according to pre-defined rules; providing permission, by the server, to modify behavior of the client application on the client device by the resident client entity according to the pre-defined rules; and rendering the application, by the client execution entity, based on the pre-defined rules.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. Throughout the drawings, the same elements will be designated by the same reference numerals.

The embodiments herein describe a method enabling the customization of an application to enhance user experience on a computing device by having one or more resident client entities negotiate with one or more client execution entities or a server on aspects of said application that can be customized.

Throughout the specification, the word "application" is application data or data to be rendered by an application or a combination of both.

Figure 1:
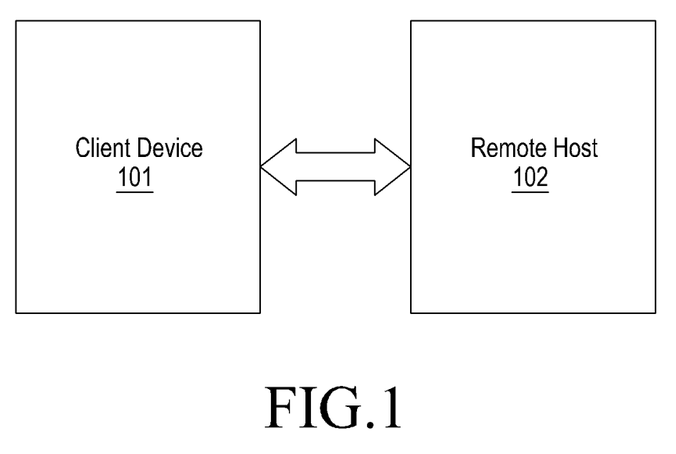
FIG. 1 is a block diagram illustrating the architecture of a client device interacting with a remote host, according to embodiments of the present invention.

FIG. 1 is a block diagram illustrating the architecture of a client device 101 interacting with a remote host 102, according to embodiments as disclosed herein. The client device 101 interacts with the remote host 102. The client device 101 requests the remote host 102 for an application or data. The remote host 102 provides the requested data/application to the client device 101 after receiving the request.

Figure 2:
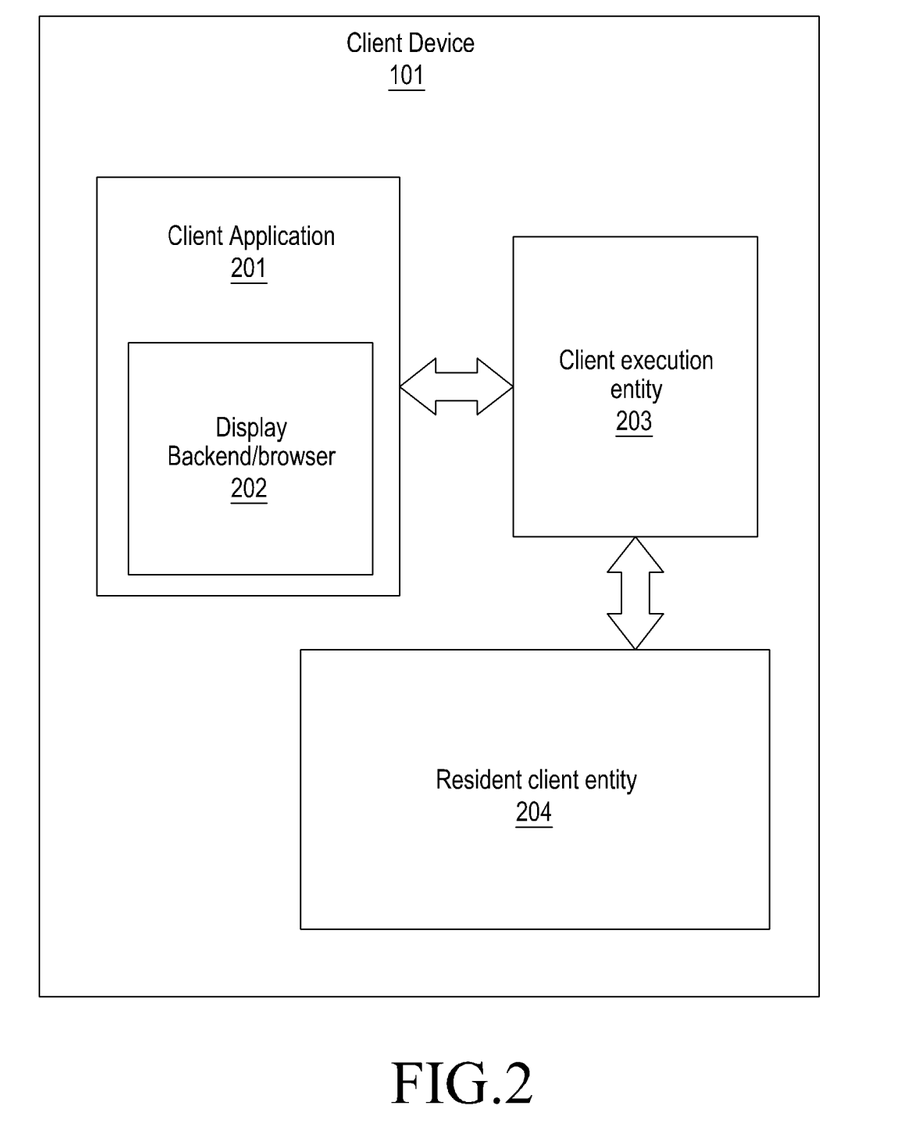
FIG. 2 illustrates the architecture of client device, according to embodiments of the present invention.

FIG. 2 illustrates the architecture of the client device 101, according to embodiments of the present invention. Embodiments herein provide two or more resident client entities (or objects) being present in the client device 101 which negotiates control aspects of a remote application in the client device 101 where one of the resident client entities in the client device 101 is a client execution entity 203 along with a client application 201. In one embodiment, the client device 101 includes a client application 201, at least two resident client entities, and a display backend/browser 202.

In another embodiment, two resident client entities include a client execution entity 203 and a resident client entity 204. The client execution entity 203 and the resident client entity 204 interact and negotiate among themselves to modify a requested application according to user's preference. The resident client entity 204 negotiates availability of the requested application and related semantics of a remote application with the client execution entity 203 enabling preemption (In computing, preemption is the act of temporarily interrupting a task being carried out by a computer system, without requiring its cooperation, and with the intention of resuming the task at a later time. Such a change is known as a context switch. It is normally carried out by a privileged task or part of the system known as a preemptive scheduler, which has the power to preempt, or interrupt, and later resume, other tasks in the system) or negotiated task sharing between the resident client entity 204 and the client execution entity 203. In some embodiments, the resident client entity 204 preempts the task of modifying the application per the user's preferences before handing over the application to the client execution entity 203 for further processing and rendering. In some other embodiments, the client execution entity 203 and the resident client entity 204 can work together and share the tasks of modifying and executing the application according to user's preferences to get output.

In another embodiment, the interaction between the resident client entity 204 and the client execution entity 203 involves the remote host 102. When an application is passed from the resident client entity 204 to the client execution entity 203 for rendering or vice-versa for modification, permission is acquired from the remote host 102 in order to customize the application.

In some embodiments, the interaction between the resident client entity 204 and the client execution entity 203 does not involve the remote host 102. When no remote host 102 is involved, the resident client entities generally do not require permission to customize the applications.

The client execution entity 203 renders the application passed from the resident client entity 204 or downloaded from the remote host 102 onto the client device 101 to be executed by the client execution entity 203. Further, the client execution entity 203 interacts with the client application 201 to render the application on the display backend or browser 202. In an embodiment, the client execution entity 203 is a browser engine and the client application 201 is a browser application, either on a mobile device or a desktop.

In other embodiments, customization is performed based on user preferences or by a set of pre-coded rules in the resident client entity 204 or a combination of both.

In an example, a user provides a set of high-level preferences on the area used by an example application-1 and by an example application-2. The user can specify that he prefers to see example application-2 always on top or in a corner of the screen. Such high-level indications are captured through a high-level interface application and converted into an Extensible Markup Language (XML) document for interpretation by the resident client entity 204. In various embodiments, such an XML document is used to transfer information as part of the negotiation between the resident client entity 204, the client execution entity 203, and the remote host 102.

In other embodiments, a similar set of rules is pre-coded by device manufactures into the client device 101 for interpretation by the resident client entity 204. These sets of rules are used as the basis for triggering the negotiation by the resident client entity 204 either with the client execution entity 203 or the remote host 102.

Figure 3:
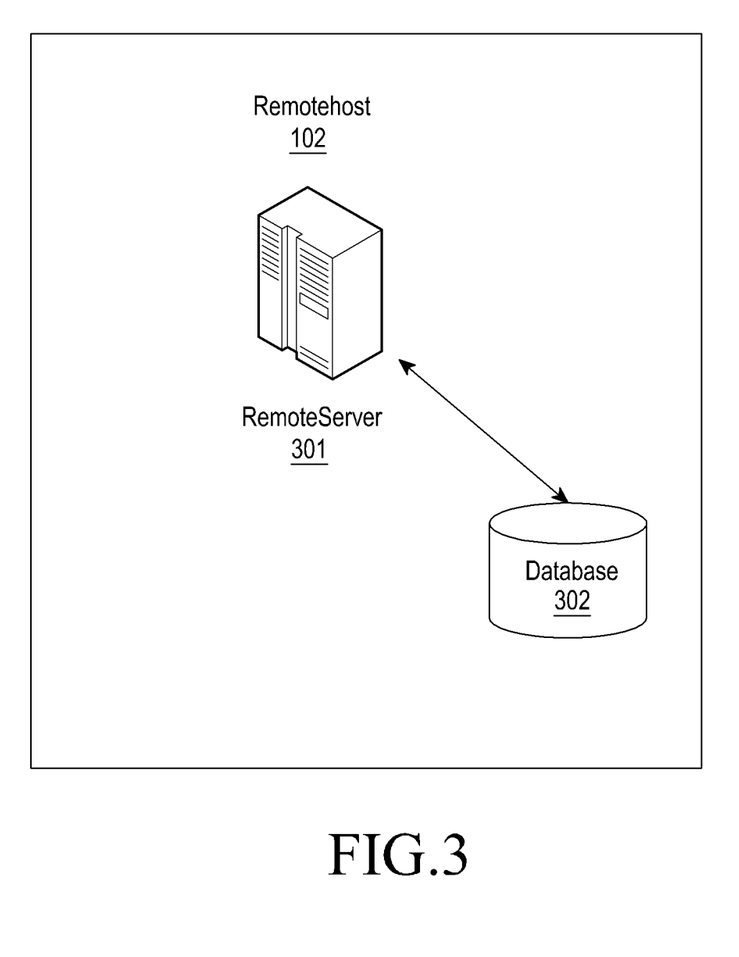
FIG. 3 illustrates the architecture of remote host, according to embodiments of the present invention.

The remote host 102 provides the requested application to the client device 101. FIG. 3 depicts the architecture of the remote host 102, according to embodiments of the present invention. In an embodiment, the remote host 102 includes one or more servers 301.

In an embodiment, the server 301 is connected to one or multiple databases 302. Further, the databases 302 connected to the server 301 is local in the remote host 102 or arranged in a distributed manner to the remote host 102. The client device 101 sends a request to the server 301 for an application. The server 301 delivers the requested application to the user device 102. In some embodiments, the requested application can be delivered unformatted by the server 301. In other embodiments, the application is delivered after formatting the application according to customization requirements provided either by the client execution entity 203 or the resident client entity 204.

The client device 101 makes a request for an application from the remote host 102. The request for an application from the client device 101 could be made from any of the resident client entities in the client device 101 i.e., resident client entity 204 or client execution entity 203.

Figure 4:
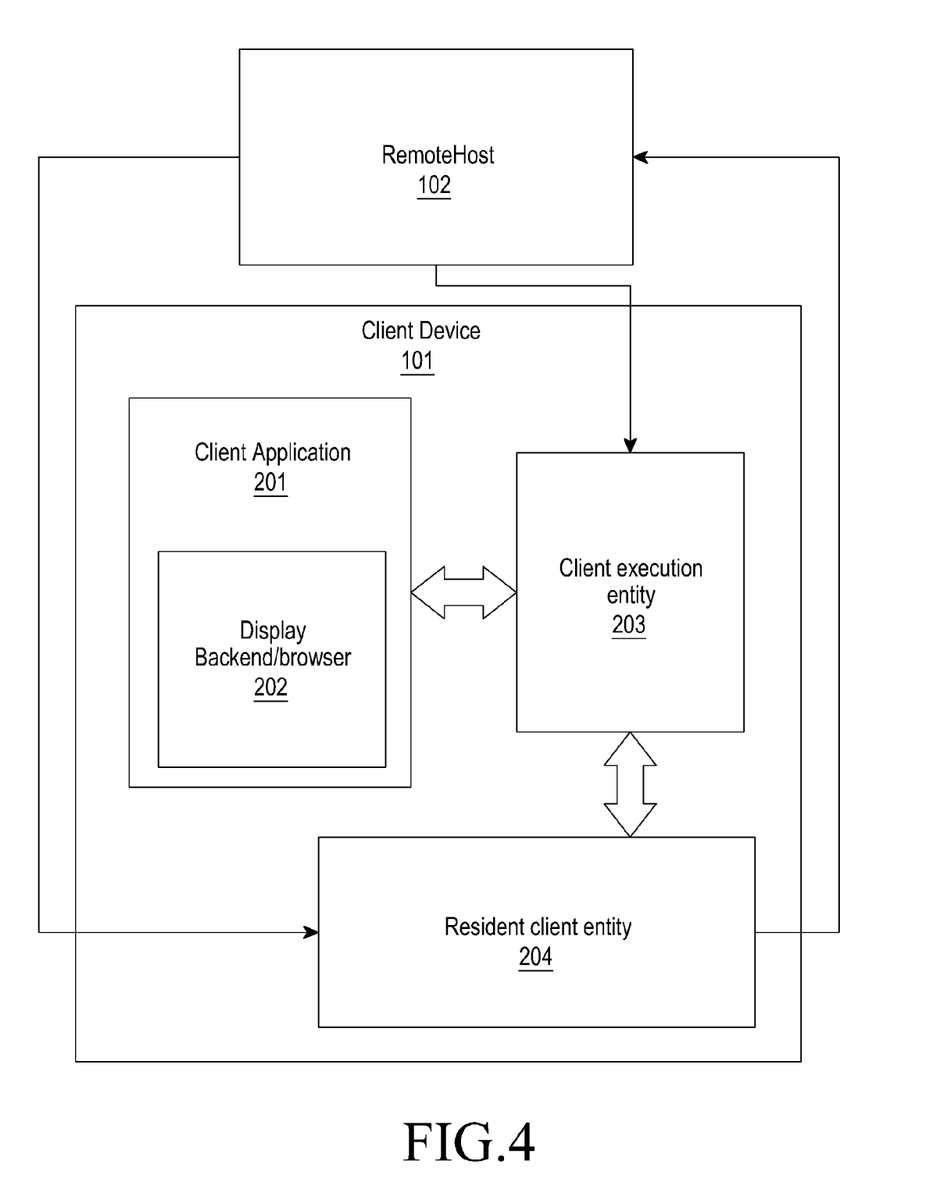
FIG. 4 illustrates the architecture of client device interacting with remote host through a resident client entity, according to embodiments of the present invention.

In an embodiment, the resident client entity 204 interacts with the remote host 102. FIG. 4 illustrates the architecture of the client device 101 interacting with the remote host 102 through the resident client entity 204, according to embodiments of the present invention. The resident client entity (or an object) 204 negotiates exposure of the data elements/media elements and the related semantics of the client application 201 with the remote host 102. The remote host 102 delivers the requested data to any of the resident client entities (i.e., resident client entity 204 or client execution entity 203) in the client device 101.

In another embodiment, the resident client entity 204 receives the requested data from the remote host 102. The received data is modified by the remote host 102 per user's preferences or pre-coded rules. The modified data is then passed either to the resident client entity 204 or to the client execution entity 203.

In another embodiment, the resident client entity 204 of the client device 101 receives permission along with requested data for preemption or a negotiated task sharing between the two resident client entities for application rendering on the client device 101. The resident client entity 204 obtains application type information from the client execution entity 203 before negotiating aspects of the rendering with the remote host 102.

In some embodiments, the resident client entity 204 negotiates to undertake the task for customizing the application downloaded and forwarding it to the client execution entity 203 for further processing and rendering. In some other embodiments, the resident client entity 204 provides the information for customization, and the customization is performed by the client execution entity 203 before further processing and rendering of the application.

Figure 5:
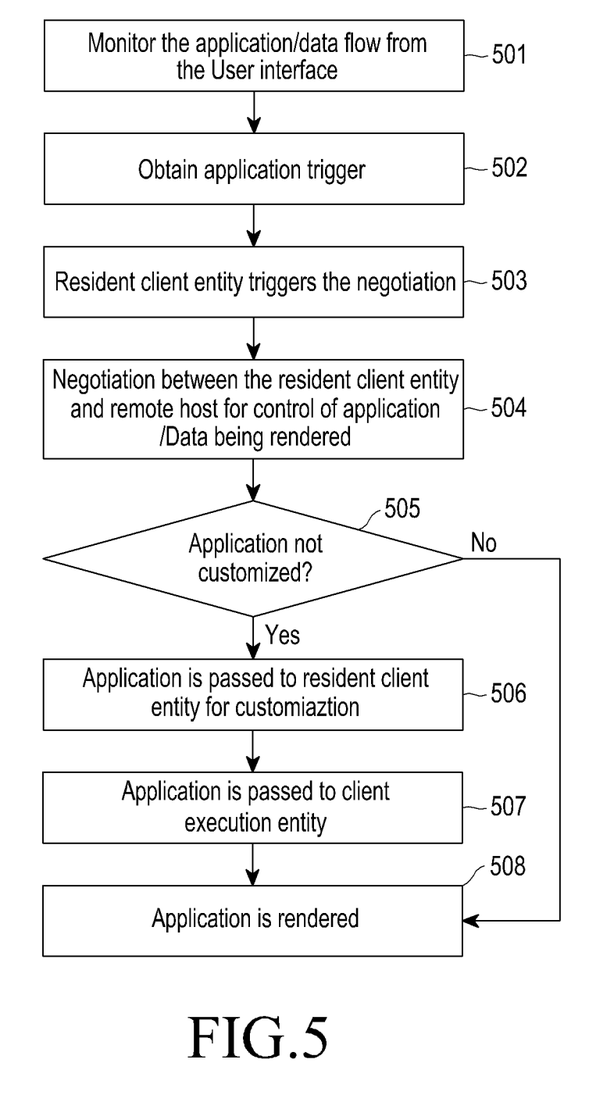
FIG. 5 is a flowchart illustrating the flow at the resident client entity, according to embodiments of the present invention.

FIG. 5 is a flowchart that illustrates the flow at the resident client entity 204, according to embodiments of the present invention. A user interacts with the client device 101 through a user interface. The user may place his or her request through the user interface. In step 501, the resident client entity 204 keeps monitoring the application flow from the user interface. The resident client entity 204 is triggered in step 502 upon receiving a specific application request. Once the application is triggered, the resident client entity 204 triggers (503) the negotiation parameters. The negotiation is performed in step 504 between the resident client entity 204 and the remote host 102 to control the application to be rendered on the client device 101. Once the negotiation is performed, the application is provided from the remote host 102 to the client device 101.

In various embodiments, the application delivered in step 505 to the client device 101 is customized by the remote host 102—as per user's request or is delivered without customization. The requested application from the remote host 102 can be received either by the resident client entity 204 or the client execution entity 203 according to negotiations in various embodiments. If the received application is not customized in step 505, the application is passed in step 506 onto the resident client entity 204 for customization as per user preferences or pre-coded rules. Once the application is customized, the application is passed on to the client execution entity 203 for further processing and rendering in step 507. If the received application is customized by the remote host 102, the customized application is passed to the client execution entity 203 for further processing and rendering in step 508 onto the client application 201.

The various actions in the method 500 are performed in the order presented, in a different order or simultaneously. Further, in some embodiments, some actions listed in FIG. 5 are omitted.

Figure 6:
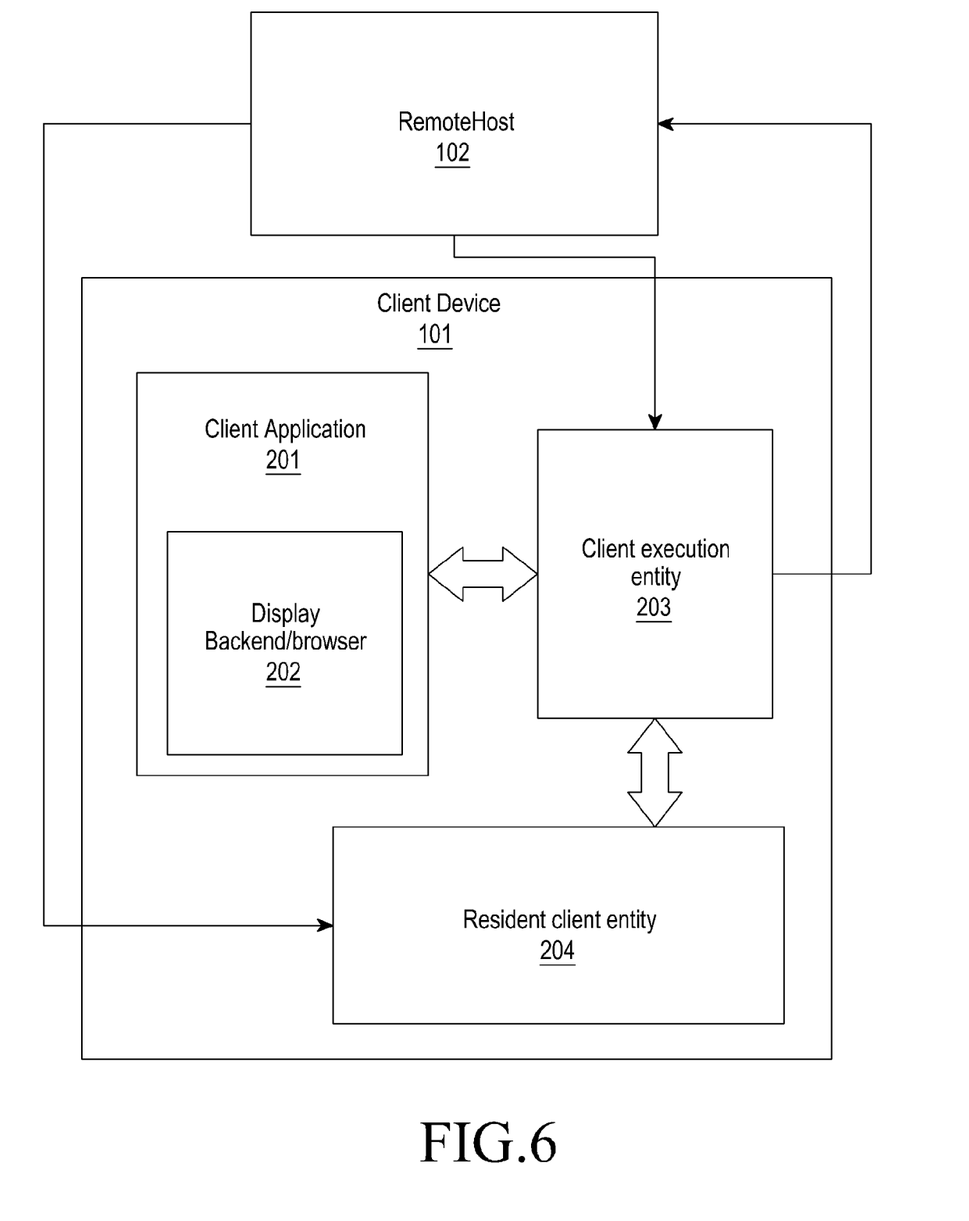
FIG. 6 illustrates the architecture of client device interacting with remote hosting server through cloud client execution entity, according to embodiments of the present invention.

In another embodiment, the resident client entity 204 negotiates with the remote host 102 through the client execution entity 203. FIG. 6 depicts architecture of the client device 101 interacting with a remote host 101 through the client execution entity 203, according to embodiments of the present invention. The client execution entity (or an object) 203 negotiates exposure of the data elements/media elements and the related semantics of a client application 201 with the remote host 102 enabling preemption or negotiated task sharing between the resident client entity 204 and the client execution entity 203.

In another embodiment, the resident client entity 204 receives the requested application from the remote host 102. The received application is modified by the remote host 102 per the user's preferences or per the pre-coded rules in the resident client entity 204. The modified data is passed either to the resident client entity 204 or to the client execution entity 203.

In another embodiment, the resident client entity 204 or the client execution entity 203 receives the application from remote host 102 along with permission for preemption or a negotiation task sharing between the two resident client entities for data rendering on the client device 101. The resident client entity 204 and the client execution entity 203 can work together to execute a task by sharing the task based on the permission obtained from the server 102.

In some embodiments, the resident client entity 204 negotiates to overtake the task for customizing the application downloaded from remote host 102 and forwarding it to the client execution entity 203 for further processing and rendering. In some other embodiments, the resident client entity 204 provides the information for customization, and the customization is performed by the client execution entity 203 before further processing and rendering of the application.

In various embodiments, the task sharing between the resident client entity 204 and the client execution entity 203 involves aspects of shared rendering of the application on the client application 201 in styles local to the two entities.

In various embodiments, the task sharing may also involve one of the resident client entities associating the input/output interfaces with the application being rendered. For example, the data received from the remote host 102 is associated with their respective input/output data format. An image file, video file, webpage are associated with a Graphics Interchange Format (GIF), Moving Picture Experts Group (MPEG), HyperText Markup Language (HTML) rendering applications respectively and then is rendered to the client application 201 accordingly.

Figure 7:
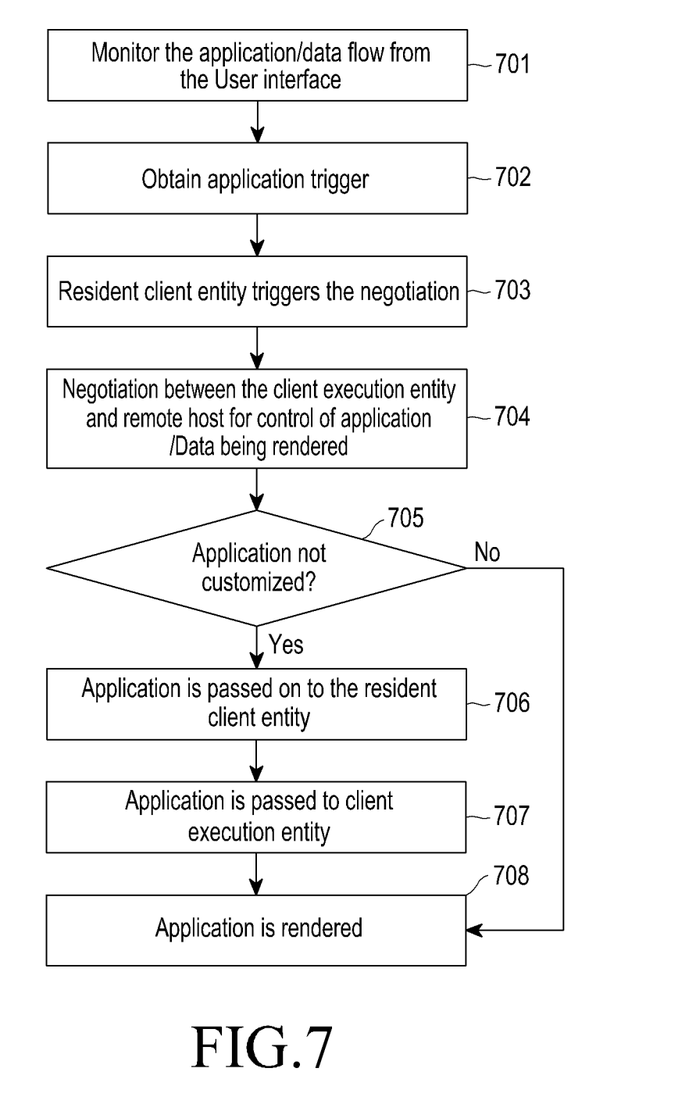
FIG. 7 is a flowchart illustrating the flow at the cloud client execution entity, according to embodiments of the present invention.

FIG. 7 is a flowchart that illustrates the flow at the client execution entity 203, according to embodiments of the present invention. In step 701, the resident client entity 204 keeps monitoring the application flow from the user interface of the client device 101. The resident client entity 204 is triggered in step 702 upon receiving an application request.

Once the application is triggered, the client execution entity 203 triggers, in step 703, the negotiation parameters. The negotiation is performed in step 704 between the client execution entity 203 and the remote host 101 for control of the application to be rendered on the client device 101. Once the negotiation performed, the application is provided by the remote host 102 to the client device 101. In some embodiments, the application delivered to the client device 101 is customized by the remote host 102. In some other embodiments, the application is delivered by the remote host 102 without any customization. The requested application from the remote host 102 is received either by the resident client entity 204 or the client execution entity 203. If the received application is not customized in step 705, the application is passed, in step 706, onto the resident client entity 204 for customization per the user's preferences or pre-coded rules. After customization, the customized application is passed to the client execution entity 203 for further processing and rendering in step 707. If the application received from the remote host 102 is customized, the customized application is passed to the client execution entity 203 for rendering in step 708.

The various actions in the method 700 is performed in the order presented, in a different order or simultaneously. Further, in some embodiments, some actions listed in FIG. 7 is omitted.

Figure 8:
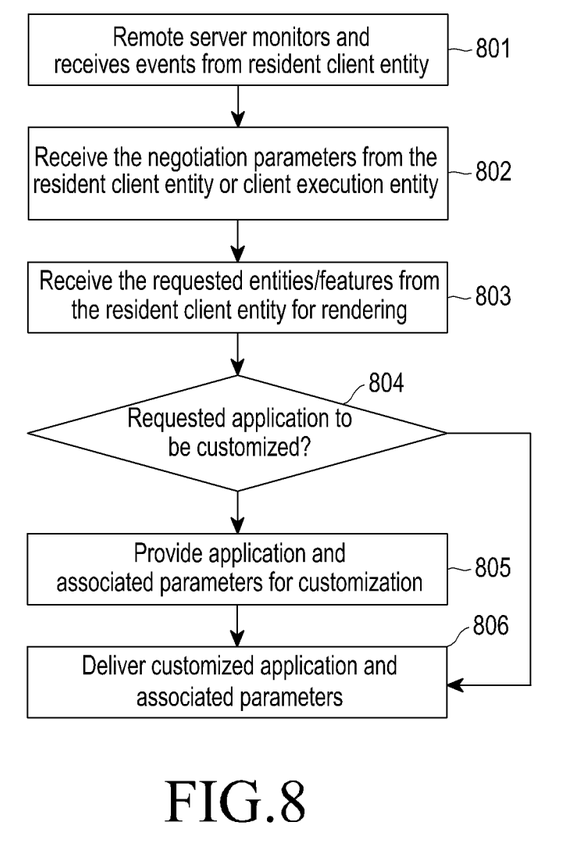
FIG. 8 is a flowchart illustrating the flow at the remote host, according to embodiments of the present invention.

FIG. 8 is a flowchart that illustrates the flow at the remote host 102, according to embodiments of the present invention. In step 801, the remote host 102 monitors and receives events from the resident client entity 204. In step 802, the remote host 102 receives the negotiation parameters from either the resident client entity 204 or the client execution entity 203. For example, the negotiation parameters may cover the type of skin and associated controls to use for a media player to be rendered by the browser. After the negotiation is performed, the remote host 102 receives, in step 803, the request from either the resident client entity 204 or the client execution entity 203. The remote host 102 modifies, in step 804, the requested application per the user's preferences or pre-coded rules before delivering the application with its associated parameters to the client device 101.

In step 805, the remote host 102 delivers requested application with associated parameters to allow changes on the application by the resident client entities. The delivered application is customized by the resident client entity 204 and then be passed to the client execution entity 203 with its associated parameters to render, in step 806, the requested application on the client's device 101.

The various actions in method 800 is performed in the order presented, in a different order or simultaneously. Further, in some embodiments, certain actions listed in FIG. 8 is omitted.

EXAMPLES

The mechanisms of client device 101 are explained by an example of a web browser. In an embodiment, the resident client execution entity 203 and the client application 201 are considered as a browser engine and a browser application respectively.

Figure 9:
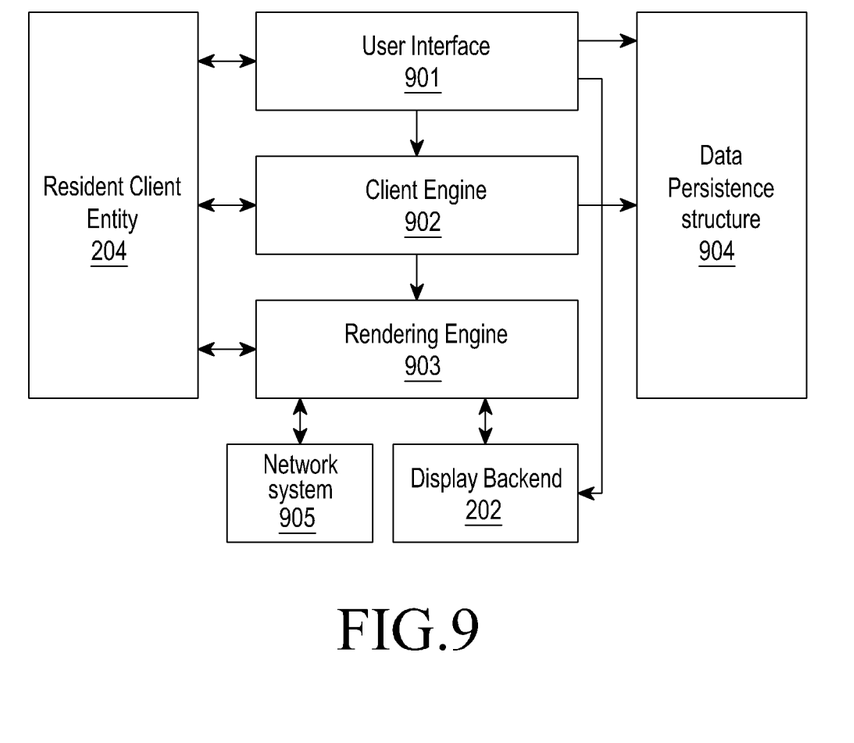
FIG. 9 illustrates the architecture of a web browser, according to embodiments of the present invention.

FIG. 9 illustrates the architecture of a web browser, according to embodiments of the present invention. A client device 101 interacts with the web browser through a user interface 901 of the client device 101. The client device 101 provides its request through the client engine 902 that is a browser or some other entity with similar features.

The User Interface 901 is a layer between the user and the client engine 902. It provides features such as toolbars, visual page-load progress, smart download handling, preferences, and printing. It is integrated with the desktop or mobile environment to provide browser session management or communication with other desktop or mobile applications. Further, the user interface 901 interacts with a data persistence structure 904.

The client engine 902 is an embeddable component that provides a high-level interface to a rendering engine 903. The client engine 902 receives the input from the user interface 901. The client engine 902 can be a browser or some other entity having similar features. It loads a given Uniform Resource Identifier (URI) and supports primitive browsing actions such as forward, back, and reloads. It provides hooks for viewing various aspects of the browsing session such as current page load progress and JavaScript alerts. Moreover, it allows the querying and manipulation of the rendering engine 903 settings. Furthermore, the client engine 902 is provided by a client software provider. Furthermore, the client engine 902 interacts with the data persistence structure 904.

The rendering engine 903 produces a visual representation for a given URI. It is capable of displaying Hyper Text Markup Language (HTML) and Extensible Markup Language (XML) documents, optionally styled with Cascading Style Sheets (CSS), as well as embedded content such as images. It calculates the exact page layout and uses "reflow" algorithms to incrementally adjust the position of elements on the page. The reflow algorithm tries to keep lines the same length but also tries to break at punctuation, and to avoid breaking within a proper name or after certain connectives. The result is more readable since fewer phrases are broken across line breaks. The rendering engine 903 also includes the HTML parser. Further, the rendering engine 903 interacts with the display backend 202 and a network system 905.

The display backend 202 is used to display the data or application received from the remote host 102 on the client device 101. The user interface 901 and the client engine 902 interact with the data persistence structure 904.

The networking subsystem 905 implements file transfer protocols such as HTTP and File Transfer Protocol (FTP). It translates between different character sets, and resolves Multipurpose Internet Mail Extensions (MIME) media types for files. It implements a cache of recently retrieved resources. Further, the user interface 901, the client engine 902 and the rendering engine 903 interacts with the resident client entity 204. The resident client entity 204 taps the user interfaces 901 for specific user actions or events and subsequently takes control of the client engine 902 functions to interface with the rendering engine 903 to achieve rendering in a style different style as intended by the device manufacturer.

According to embodiments of the present invention, there will be at least two resident client entities controlling one rendering engine 903. Multiple client engines 902 can be active at the same time and can control different aspects of the rendering engine 903 and thus the rendered user experience. Further, the resident client entity 204 is provided by the device manufacturer as software. The data persistence structure 904 is a data structure that always preserves the previous version of itself when it is modified; such data structures are effectively immutable, as their operations do not update the structure in-place, but instead yield a new updated structure. The resident client entity 204 taps the client web browser to monitor the data flow from the client engine 902. In some embodiments, the client execution entity 203 is a web browser on a device like a mobile device or a personal computer.

Figure 10:
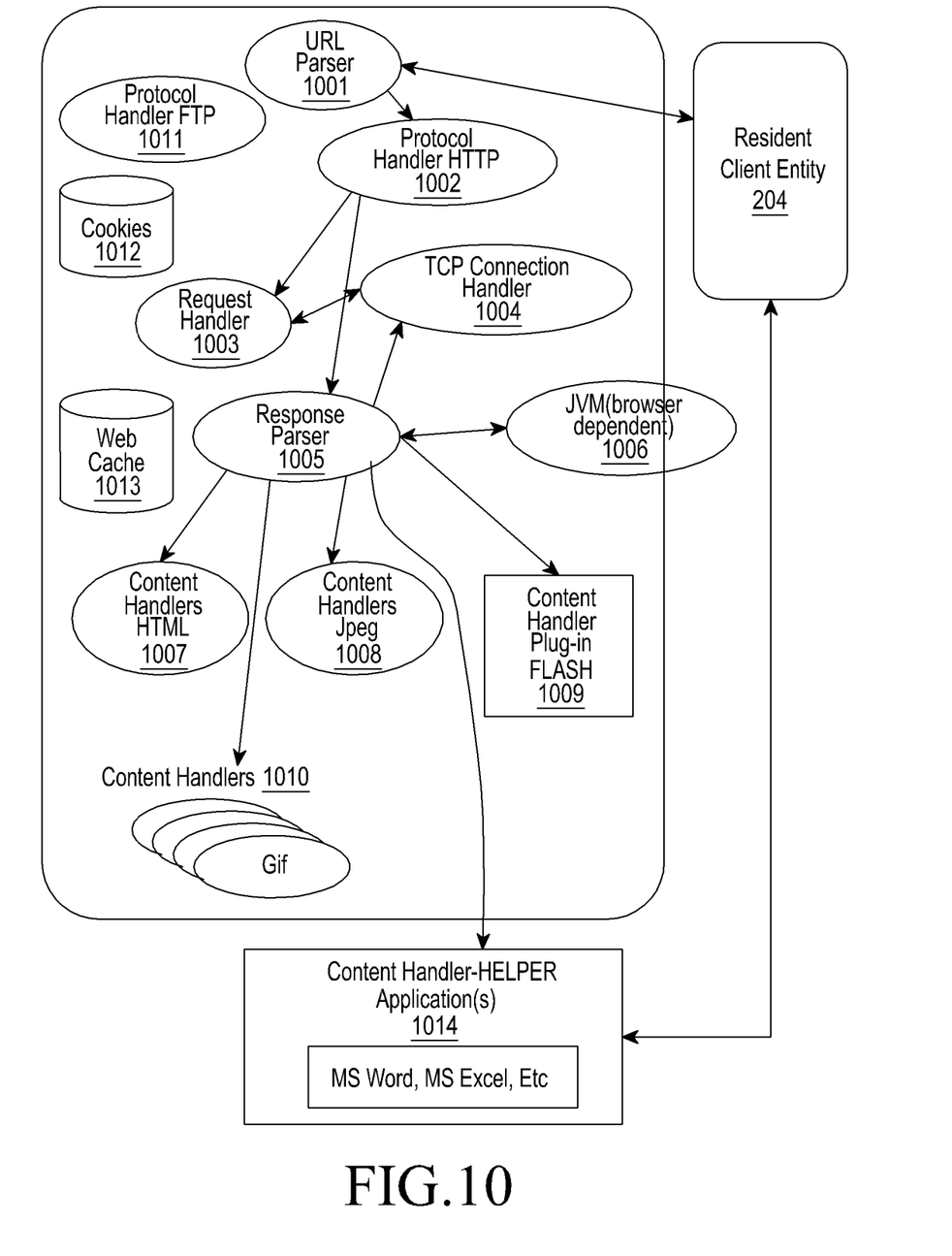
FIG. 10 illustrates the architecture of web browser implementation and resident client entity tapping into the client browser, according to embodiments of the present invention.

FIG. 10 illustrates the architecture of web browser implementation and resident client entity tapping into the client browser, according to an example embodiment where the client execution entity 203 is a browser engine and the client application 201 is a browser. The client device 101 makes a request for an application through a browser by giving a Uniform Resource Locator (URL). The URL entered by the user identifies a resource location and process the client request. URL parsing 1001 in a browser enables traffic management and load-balancing. URL parsing 1001 interacts with resident client entity 204. The resident client entity 204 stores the client preference. The resident client entity 204 negotiates the rendering exposure of data elements with the remote host 102 and also with the execution entity 203. Further, the URL parser 1001 interacts with protocol handler HTTP 1002.

Protocol handler 1002 defines the communication protocol between the device/browser and a remote host. These defined protocols are used to handle the client's request. The protocol handler processes a particular phase of a request and passes a reference to the request object. A connection is established between the browser and a server of requested object with the help of Transmission Control Protocol (TCP) connection handler. The request handlers 1003 typically inspect the request and write the appropriate response to the request.

Further, the protocol handler HTTP 1004 defines protocol for a response parser 1005. The response parser manages the traffic and load on the browser.

The requested applications are retrieved from the server. The applications to be delivered are rendered by the browser. Several content handlers like HTML 1007, jpeg 1008, plug-in FLASH 1009, gif 1010, and applications 1014 are present in the browser. Further, the content handlers interact with resident client entity 204. The content handlers enable to set up data repositories and manipulate the data model prior before rendering the content item.

Figure 11:
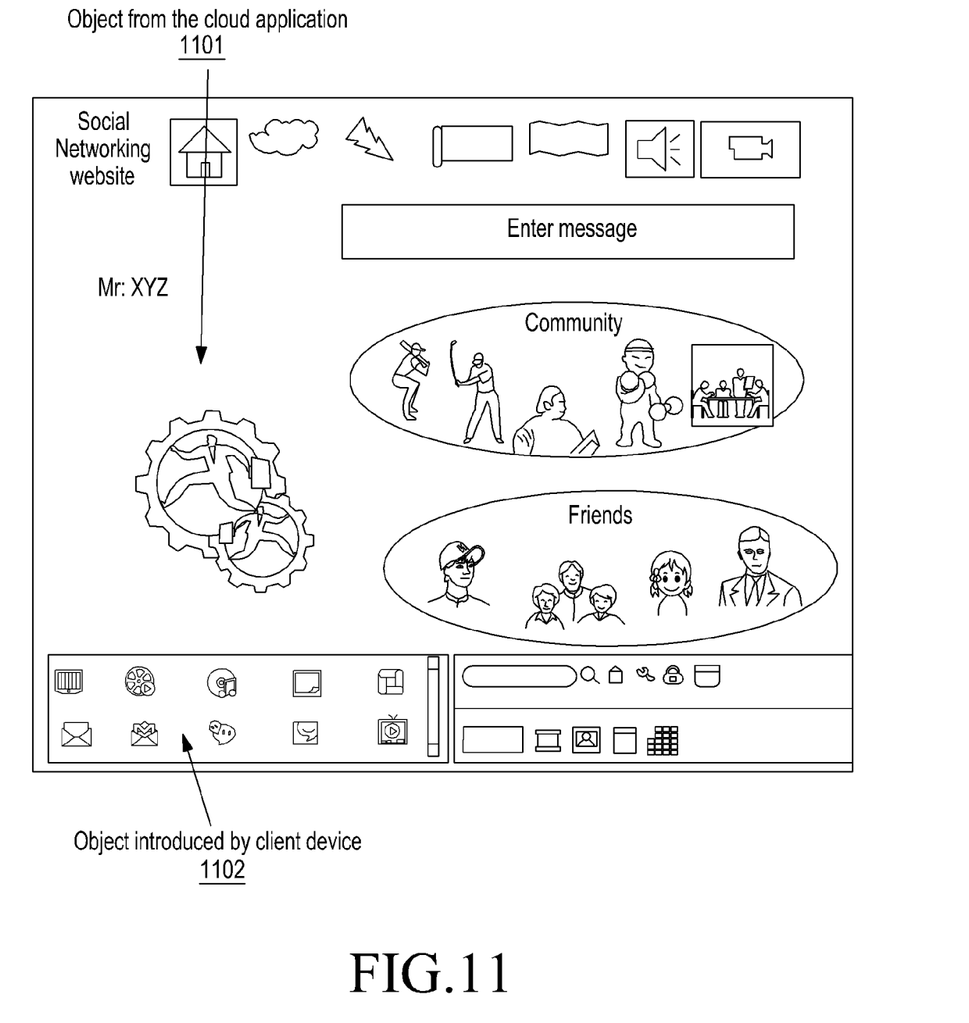
FIG. 11 is a screenshot of a webpage illustrating user interface control objects inserted at a desktop client device, according to embodiments of the present invention.

FIG. 11 is a screenshot of a webpage depicting user interface control objects inserted at the desktop client device, according to embodiments of the present invention. A user request for a specific data (a webpage of a particular website) on a desktop through a user interface which could be through a browser. For example, a user requests for the webpage 1101. The browser downloads the webpage along with associated parameters from the remote host 102. The resident client entity 204 modifies the webpage 1101 per the user's preferences or pre-coded rules. In an embodiment, the requested webpage is passed to the desktop browser engine that incorporates control objects 1102 in the requested webpage 1101 according to user preferences or pre-coded rules. The control objects could be related to collaboration when the webpage 1101 is a social media webpage. The webpage 1101 that is customized according to user preferences or pre-coded rules is rendered by the browser as it would render any other application. The user can use the inserted control objects to further collaborate using the tools on the control object 1102 beyond the facilities available on a social media webpage as illustrated in the screenshot.

Figure 12:
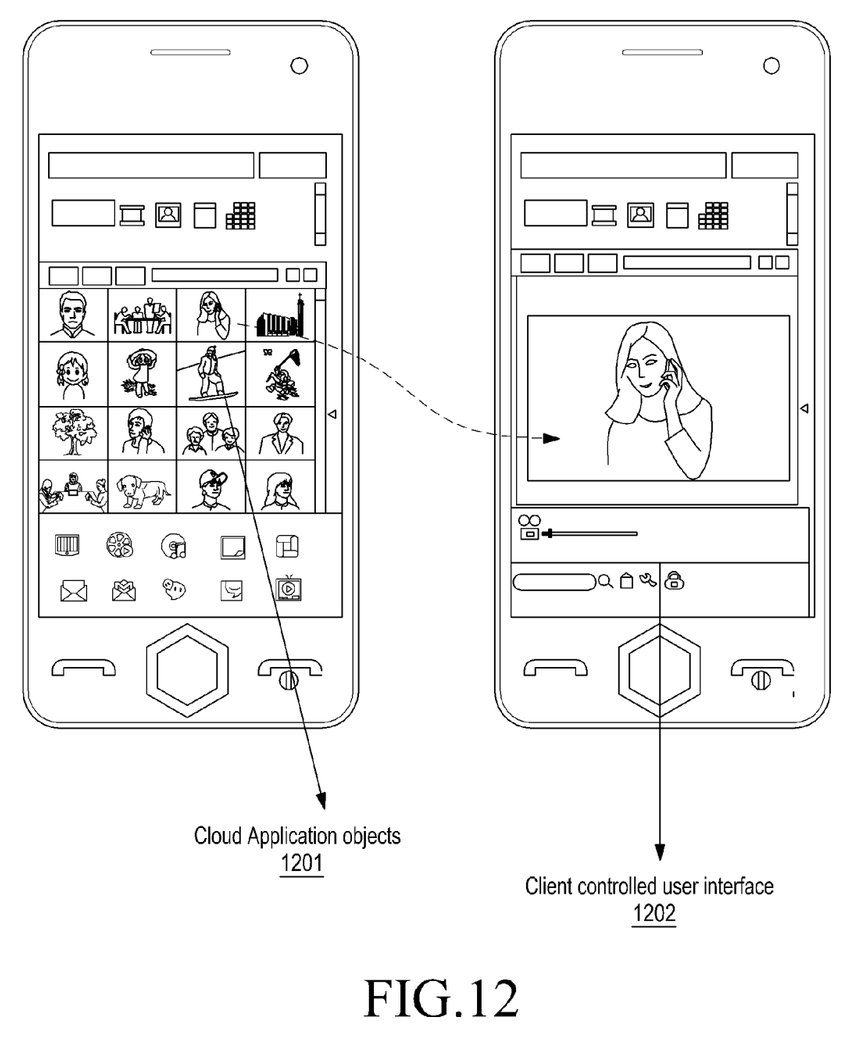
FIG. 12 is a screenshot of a browser illustrating user interface control objects inserted at a client mobile device, according to embodiments of the present invention.

FIG. 12 is screenshot of a browser illustrating user interface control objects inserted at a client mobile device, according to embodiments of the present invention. A user request for a specific data on a mobile through a user interface which could be through a browser. For example, a user requests for a video 1201 with some control objects 1202. The browser downloads the video file 1201 along with associated parameters from the remote host 102. The resident client entity 204 modifies the video 1201 per the user's preference or pre-coded rules. Further, the requested video 1201 is passed to the mobile browser engine that incorporates control objects on the requested video 1201. Further, the video 1201 with incorporated control objects is delivered to the user's mobile device. Using the customized application, the user edits and/or controls the video 1201 with the help of incorporated control objects.

The embodiments disclosed herein can be implemented through at least one software program running on at least one hardware device including a processor a memory and performing network management functions to control the network elements. The network elements shown in FIGS. 1, 3, 4, 6 and 9 include blocks which can be a hardware device, or a combination of hardware device and software module.

The embodiments disclosed herein provide methods and systems to enable the customization of an application to enhance user experience on a computing device by having one or more resident client entities negotiate with one or more client execution entities or a server on aspects of said application that can be customized. Therefore, it will be understood that the scope of the invention is extended to such a program and in addition to a computer readable means having a message therein, such computer readable storage means contain program code means for implementation of one or more steps of the method, when the program runs on a server or mobile device or any suitable programmable device. The method is implemented in an embodiment through or together with a software program written in e.g., Very high speed integrated circuit Hardware Description Language (VHDL), another programming language, or implemented by one or more VHDL or several software modules being executed on at least one hardware device. The hardware device may be any kind of portable device that can be programmed. The device may include means such as hardware means like e.g. an ASIC, or a combination of hardware and software means, e.g. an ASIC and an FPGA, or at least one microprocessor and at least one memory with software modules located therein. The method described herein could be implemented partly in hardware and partly in software. Alternatively, the invention is implemented on different hardware devices, e.g. using a plurality of CPUs.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A method of controlling user experience in connection with an application in a client device, the method comprising:
   detecting, by the client device, a triggering of a social media webpage;
   requesting, by the client device, the social media webpage from a server, in response to the triggering;
   receiving, by the client device, the social media webpage from the server;
   modifying, by the client device, an operation of the social media webpage by incorporating at least one control object related to a tool including a collaboration function based on at least one of a user preference and a pre-defined rule; and
   rendering the social media webpage on the client device, based on the modification,
   wherein the client device includes a client execution entity and a resident client entity,
   wherein the client execution entity includes a browser engine and the resident client entity modifies the operation of the social media webpage based on at least one of the user preference and the pre-defined rule, and wherein modifying the operation of the social media webpage by the client device further comprises negotiating by the client execution entity and the resident client entity to delegate at least one task performed by the client execution entity to the resident client entity.

2. The method of claim 1, wherein modifying the operation of the social media webpage further comprises modifying an element associated with the social media webpage, the element including at least one of a data element, a media element, a semantic, a mark-up, a style, a script, HyperText Markup Langue (HTML), eXtensible HyperText Markup Language (XHTML), eXtensible Markup Language (XML), Scalable Vector Graphics (SVG), Cascading Style Sheets (CSS) and JavaScript (JS).

3. The method of claim 1, wherein the pre-defined rule includes a pre-coded rule.

4. The method of claim 1, wherein the at least one task is rendering the social media webpage.

5. The method of claim 1, wherein the negotiating is performed using eXtensible Markup Language (XML) schema.

6. The method of claim 1, wherein modifying the operation of the social media webpage by the client device further comprises obtaining application type information from the client execution entity by the resident client entity, before initiating the negotiating.

7. The method of claim 1, further comprising transmitting the at least one of the user preference and the pre-defined rule to the server; and receiving permission from the server to modify the operation of the social media webpage, by the client device, based on the at least one of the user preference and the pre-defined rule, prior to the modifying.

8. A client device for controlling user experience in connection with an application executed therein, the client device comprising:

a transceiver configured to communicate with a server; and
a controller configured to
    detect a triggering of a social media webpage,
    request the social media webpage from the server via the transceiver, in response to the triggering,
    receive the social media webpage from the server via the transceiver,
    modify an operation of the social media webpage by incorporating at least one control object related to a tool including a collaboration function, based on at least one of a user preference and a pre-defined rule, and
render the social media webpage on the client device, based on the modification,
wherein the controller includes a client execution entity and a resident client entity,
wherein the client execution entity includes a browser engine and the resident client entity modifies the operation of the social media webpage based on at least one of the user preference and the pre-defined rule, and
wherein the client execution entity and the resident client entity perform negotiating with each other to delegate at least one task performed by the client execution entity to the resident client entity.

9. The client device of claim 8, wherein the controller is further configured to modifying an element associated with the social media webpage, the element including at least one of a data element, a media element, a semantic, a mark-up, a style, a script, HyperText Markup Langue (HTML), eXtensible HyperText Markup Language (XHTML), eXtensible Markup Language (XML), Scalable Vector Graphics (SVG), Cascading Style Sheets (CSS) and JavaScript (JS).

10. The client device of claim 8, wherein the pre-defined rule includes a pre-coded rule.

11. The client device of claim 8, wherein the at least one task is rendering the social media webpage.

12. The client device of claim 8, wherein the negotiating is performed using eXtensible Markup Language (XML) schema.

13. The client device of claim 8, wherein the resident client entity obtains application type information from the client execution entity, before initiating the negotiating.

14. The client device of claim 8, wherein the controller is further configured to transmit the at least one of the user preference and the pre-defined rule to the server, and to receive permission from the server to modify the operation of the social media webpage, based on the at least one of the user preference and the pre-defined rule, prior to the modifying.

15. A method of controlling user experience in connection with an application in a client device, the method comprising:

detecting, by the client device, a triggering of a social media webpage;
requesting, by the client device, the social media webpage from a server;
transmitting, by the client device, to the server, at least one of a user preference and a pre-defined rule for modifying an operation of the social media webpage by incorporating at least one control object related to a tool including a collaboration function;
receiving, by the client device, from the server, the social media webpage including the operation modified based on the at least one of the user preference and the pre-defined rule; and
rendering, by the client device, the social media webpage received from the server,
wherein the client device includes a client execution entity and a resident client entity, and
wherein rendering the social media webpage received from the server comprises negotiating by the client execution entity and the resident client entity to delegate the rendering performed by the client execution entity to the resident client entity.

16. The method of claim 15, wherein the server further modifies the operation of the social media webpage by modifying an element associated with the social media webpage, the element including at least one of a data element, a media element, a semantic, a mark-up, a style, a script, HyperText Markup Langue (HTML), eXtensible HyperText Markup Language (XHTML), eXtensible Markup Language (XML), Scalable Vector Graphics (SVG), Cascading Style Sheets (CSS) and JavaScript (JS).

17. The method of claim 15, wherein the pre-defined rule includes a pre-coded rule.

18. The method of claim 15, wherein the negotiating is performed using eXtensible Markup Language (XML) schema.

19. The method of claim 15, wherein rendering the social media webpage received from the server further comprises obtaining application type information from the client execution entity by the resident client entity, before initiating the negotiating.

20. A client device for controlling user experience in connection with an application executed therein, the client device comprising:

a transceiver configured to communicate with a server; and
a controller configured to
    detect a triggering of a social media webpage, request the social media webpage from the server via the transceiver, transmit, to the server, via the transceiver, at least one of a user preference and a pre-defined rule for modifying an operation of the social media webpage by incorporating at least one control object related to a tool including a collaboration function, receive, from the server, via the transceiver, the social media webpage including the operation modified based on the at least one of the user preference and the pre-defined rule, and render the social media webpage received from the server, wherein the controller includes a client execution entity and a resident client entity, and wherein the client execution entity and the resident client entity perform negotiating with each other to delegate the rendering performed by the client execution entity to the resident client entity.

21. The client device of claim 20, wherein the server further modifies the operation of the social media webpage by modifying an element associated with the social media webpage, the element including at least one of a data element, a media element, a semantic, a mark-up, a style, a script, HyperText Markup Langue (HTML), eXtensible HyperText Markup Language (XHTML), eXtensible Markup Language (XML), Scalable Vector Graphics (SVG), Cascading Style Sheets (CSS) and JavaScript (JS).

22. The client device of claim 20, wherein the pre-defined rule includes a pre-coded rule.

23. The client device of claim 20, wherein the negotiating is performed using eXtensible Markup Language (XML) schema.

24. The client device of claim 20, wherein the resident client entity obtains application type information from the client execution entity, before initiating the negotiating.

* * * * *